(12) United States Patent
Wang et al.

(10) Patent No.: US 7,660,786 B2
(45) Date of Patent: Feb. 9, 2010

(54) DATA INDEPENDENT RELEVANCE EVALUATION UTILIZING COGNITIVE CONCEPT RELATIONSHIP

(75) Inventors: Lee Wang, Kirkland, WA (US); Ying Li, Bellevue, WA (US); Pascale Queva, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 315 days.

(21) Appl. No.: 11/304,450

(22) Filed: Dec. 14, 2005

(65) Prior Publication Data

US 2007/0136343 A1 Jun. 14, 2007

(51) Int. Cl.
*G06F 17/30* (2006.01)
(52) U.S. Cl. ................. 707/3; 707/4; 707/5; 707/7; 705/14
(58) Field of Classification Search ............ 707/2, 707/3, 7, 102, 100, 5; 709/224; 70/102; 705/14
See application file for complete search history.

(56) References Cited

U.S. PATENT DOCUMENTS

| | | | | |
|---|---|---|---|---|
| 6,389,415 | B1* | 5/2002 | Chase | 707/5 |
| 6,453,315 | B1* | 9/2002 | Weissman et al. | 707/5 |
| 6,816,857 | B1* | 11/2004 | Weissman et al. | 707/5 |
| 6,961,731 | B2* | 11/2005 | Holbrook | 707/102 |
| 7,260,568 | B2* | 8/2007 | Zhang et al. | 707/3 |
| 2002/0065884 | A1* | 5/2002 | Donoho et al. | 709/204 |
| 2003/0101182 | A1* | 5/2003 | Govrin et al. | 707/7 |
| 2003/0120653 | A1* | 6/2003 | Brady et al. | 707/7 |
| 2003/0131095 | A1* | 7/2003 | Kumhyr et al. | 709/224 |
| 2004/0111408 | A1* | 6/2004 | Caudill et al. | 707/3 |
| 2004/0141354 | A1* | 7/2004 | Carnahan | 365/145 |
| 2004/0260795 | A1* | 12/2004 | Gentle et al. | 709/222 |
| 2005/0004905 | A1* | 1/2005 | Dresden | 707/3 |
| 2005/0080775 | A1* | 4/2005 | Colledge et al. | 707/3 |
| 2005/0080776 | A1* | 4/2005 | Colledge et al. | 707/3 |
| 2005/0080780 | A1* | 4/2005 | Colledge et al. | 707/4 |
| 2005/0144064 | A1* | 6/2005 | Calabria et al. | 705/14 |
| 2005/0234953 | A1* | 10/2005 | Zhang et al. | 707/101 |
| 2007/0005566 | A1* | 1/2007 | Bobick et al. | 707/2 |
| 2007/0073748 | A1* | 3/2007 | Barney | 707/101 |

OTHER PUBLICATIONS

Xiaoping Chen, Cognitive Relevance and Chance Discovery, 2005 pp. 16-20.*
Huaizhong Kou, Similarity Model and Term Association For Document Categorization, 2002, pp. 1-5.*
International Search Report dated Mar. 29, 2007, mailed Mar. 30, 3007, for International Application No. PCT/US2006/043952, 3 pages.

* cited by examiner

*Primary Examiner*—John R. Cottingham
*Assistant Examiner*—Sherief Badawi
(74) *Attorney, Agent, or Firm*—Shook, Hardy & Bacon L.L.P.

(57) ABSTRACT

A measurable means to evaluate a given relevancy verification process to a human decision process is provided. For example, a cognitive concept relationship (CCR) system can be utilized to provide a relevancy verification evaluation that is independent of the relevancy quality of the test data employed to train the relevancy verification algorithm under test. This provides a means to evaluate relevancy verification of, for example, keyword/item pairs for any number of business applications with different relevance standards and/or changes in relevance standards over time, without the need to manually re-label the test data and/or re-measure the algorithmic relevancy.

18 Claims, 12 Drawing Sheets

DATA INDEPENDENT RELEVANCE EVALUATION UTILIZING COGNITIVE CONCEPT RELATIONSHIP

BACKGROUND

Advances in networking and computing technologies have enabled the transformation of computers from low performance/high cost devices capable of performing basic word processing and computing low-level mathematical computations to high performance/low cost machines capable of a myriad of disparate functions. For example, a consumer level computing device can be employed to aid a user in paying bills, tracking expenses, communicating nearly instantaneously with friends or family across large distances by way of email, obtaining information from networked data repositories, and numerous other functions/activities. Computers and their associated peripherals have thus become a staple in modern society, utilized for both personal and business activities.

The Internet in particular has provided users with a mechanism for obtaining information regarding any suitable subject matter. For example, various web sites are dedicated to posting text, images, and video relating to world, national, and/or local news. A user with knowledge of a Uniform Resource Locator (URL) associated with one of such web sites can simply enter the URL into a web browser to be provided with the web site and access content. Another conventional manner of locating desired information from the Internet is through utilization of a search engine. For instance, a user can enter a word or series of words into a search field and initiate a search engine (e.g., through depression of a button, one or more keystrokes, voice commands, etc.). The search engine then utilizes search algorithms to locate web sites related to the word or series of words entered by the user into the search field, and the user can then select one of the web sites returned by the search engine to review related content.

As more and more people have begun to utilize the Internet, it has become apparent that revenue opportunities exist for small and large businesses alike. For instance, many retail companies utilize the Internet to sell goods online, thereby reducing costs associated with managing and maintaining a store location, providing an ability to centralize inventory, and various other similar benefits that result in decreased costs that are passed on to customers. Given this increased use of the Internet for generating business and/or revenue, it has also become apparent that the Internet can be utilized as an advertising mechanism. In one example, an individual who enters the term "flower" into a search engine may be interested in purchasing flowers—thus, it is beneficial for a company that sells flowers to advertise to that user at the point in time that the user is searching for a relevant term. Oftentimes users who are searching for information will see related advertisements and click on such advertisements to purchase flowers, thereby creating business for the flower retailer. Furthermore, the search engine is provided with additional revenue by selling advertisement space for a particular period of time to a retailer when a relevant term, such as, for example, the term "flower," is utilized as a search term.

Conventionally, advertising space relating to search terms provided to a search engine is bought or sold in an auction manner. More specifically, a search engine can receive a query (from a user) that includes one or more search terms that are of interest to a plurality of buyers. The buyers can place bids with respect to at least one of the search terms, and a buyer that corresponds to the highest bid will have their advertisement displayed upon a resulting page view. Bidding and selection of a bid can occur within a matter of milliseconds, thereby not adversely affecting usability of the search engine. Thus, two or more competing bidders can bid against one another within a limited time frame until a sale price of advertising space associated with one or more search terms in the received query is determined. This bidding is often accomplished by way of proxies (e.g., computer component) that are programmed with a demand curve for specific search term(s). As alluded to above, auctioning advertising space associated with search terms is a substantial source of revenue for search engines, and can further be a source of revenue for advertisers.

Because of the potential of a significant boost in revenue from advertising with search terms, it is very likely that a business will attempt to associate as many search terms as possible to their advertisements, even words that have no relevancy to the search terms themselves. This is typically attempted for two reasons—first, to increase exposure of the advertisement, and, second, to exclude the competition from being able to advertise. However, by allowing associations with search terms of non-relevant advertisements, users typically become quickly dissatisfied with the search engine and switch to another search engine or become hostile towards a particular advertiser for constantly displaying irrelevant advertisements every time they search. To avoid these issues, oftentimes "relevancy standards" are utilized to determine if a search term is relevant enough to allow it to be associated with a particular advertisement and/or business. Current technology to determine relevancy is very cumbersome and typically requires models that must be trained and retrained as the data changes and can only be implemented for a specific business relevancy standard. Since relevancy can change overtime (e.g., businesses add new lines, consumer trends change, words take on new meanings, etc.), current attempts to evaluate relevancy become very burdensome and time consuming to change.

SUMMARY

The following presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

The subject matter relates generally to data verification, and more particularly to systems and methods for evaluating relevancy verification processes utilized, for example, in keyword advertising auctions. It provides a measurable means to compare a given relevancy verification process to a human decision process. For instance, a cognitive concept relationship (CCR) system can be utilized to provide a relevancy verification evaluation that is independent of the relevancy quality of the test data employed to train the relevancy verification algorithm under test. This provides a means to evaluate relevancy verification of, for example, keyword/item pairs for any number of business applications with different relevance standards and/or changes in relevance standards over time, without the need to manually re-label the test data and/or re-measure the algorithmic relevancy. Thus, an extremely flexible means to evaluate relevancy verification can be achieved without the typical resources required for current relevancy verification techniques, freeing both time and resources for other purposes.

To the accomplishment of the foregoing and related ends, certain illustrative aspects of embodiments are described herein in connection with the following description and the annexed drawings. These aspects are indicative, however, of but a few of the various ways in which the principles of the subject matter may be employed, and the subject matter is intended to include all such aspects and their equivalents. Other advantages and novel features of the subject matter may become apparent from the following detailed description when considered in conjunction with the drawings.

DETAILED DESCRIPTION

Figure 1:
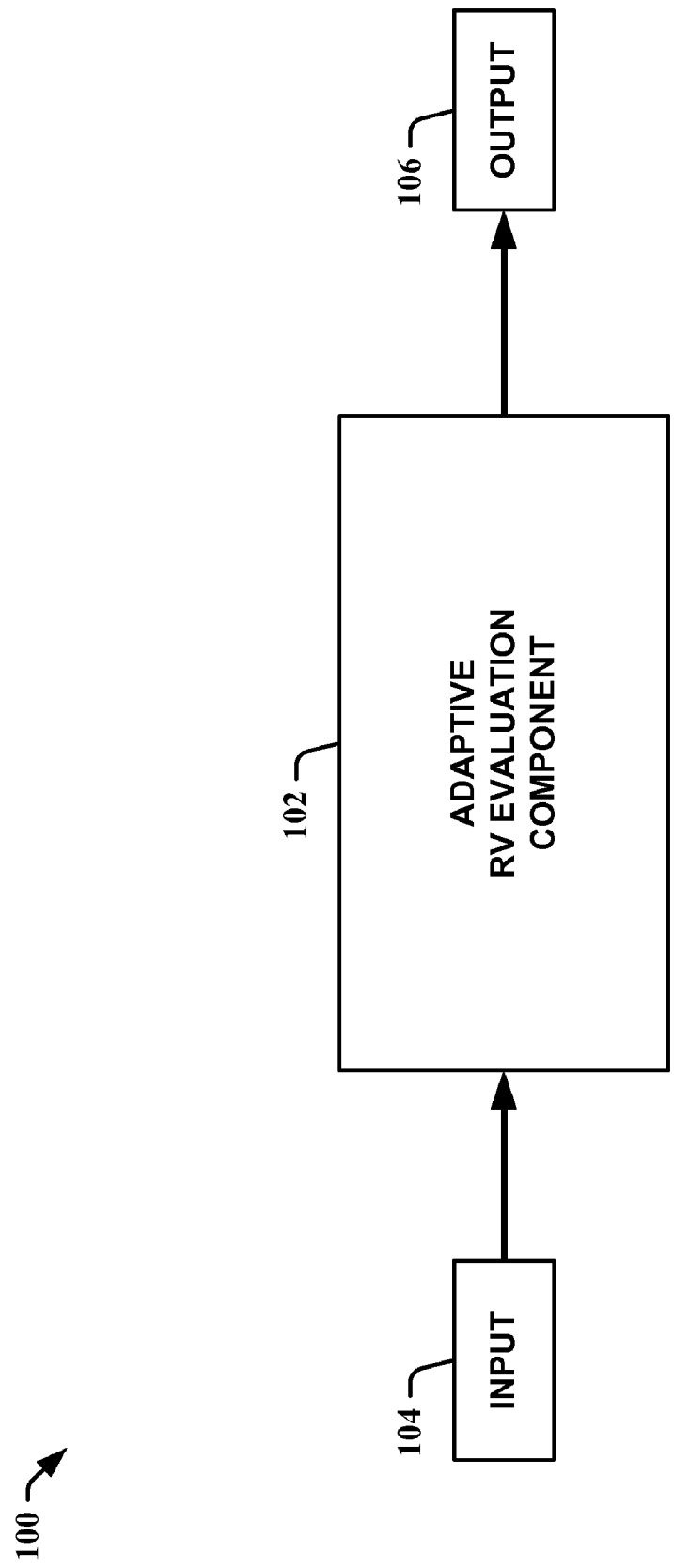
FIG. 1 is a block diagram of an adaptive RV evaluation system in accordance with an aspect of an embodiment.

The subject matter is now described with reference to the drawings, wherein like reference numerals are used to refer to like elements throughout. In the following description, for purposes of explanation, numerous specific details are set forth in order to provide a thorough understanding of the subject matter. It may be evident, however, that subject matter embodiments may be practiced without these specific details. In other instances, well-known structures and devices are shown in block diagram form in order to facilitate describing the embodiments.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

Relevancy verification (RV) describes a class of machine learning (ML) algorithms that first learns from test data to build a model, then gives algorithmic decisions on any input pairs based on what it learned (knowledge stored in the model) from the test data. Unfortunately, it takes time and resources to collect test data and to build an RV model (so called model training), and there may be multiple business relevancy standards that need to be applied to the same input data. Instances of the systems and methods herein can provide an RV evaluation solution that uses a cognitive concept relationship (CCR) system as the basis for relevance evaluation that is test data independent. Algorithmic relevancy is measured in each CCR type (horizontal evaluation) instead of measuring the algorithmic relevancy by each data set (vertical evaluation). In so doing, algorithmic relevancy is based on human cognition and, therefore, independent of the relevancy quality of the test data. Thus, instances of the systems and methods herein can support any number of business applications with different relevance standards and/or support changes in the business relevance standard over time, without the need to either manually re-label the data and/or re-measure the algorithmic relevancy.

Instances of the systems and methods herein are particularly useful in keyword auctions where advertisers bid on keywords to associate with their advertisements. With this type of association, users can be presented with advertisements based on the use of these keywords as search terms in a search engine. The more relevant the advertisement to the keyword, the more likely a user will purchase an item and/or service presented to them when the keyword is utilized for searching the Web, etc. Thus, having high relevancy between the keyword and advertisement benefits both the advertiser (e.g., reaching more appropriate customers with a higher likelihood of sales, etc.) and the user (e.g., not presented with a bunch of irrelevant, annoying advertisements, etc.)

In FIG. 1, a block diagram of an adaptive RV evaluation system 100 in accordance with an aspect of an embodiment is shown. The adaptive RV evaluation system 100 is comprised of an adaptive RV evaluation component 102 that obtains an input 104 and provides an output 106. The input 104 is typically an input pair of items that need to be checked for relevancy. In one instance, the input 104 is comprised of an advertising keyword and an advertising target (e.g., particular product and/or product line promoted by an advertising webpage, webpage advertisement, banner, etc.) and/or entity (e.g., business rather than a particular advertising target, etc.). The adaptive RV evaluation component 102 receives the input 104 and determines the relevancy of items in the input 104 and provides the output 106. In one instance, the output 106 is comprised of cognitive concept relationship (CCR) types provided by a CCR system utilized by the adaptive RV evaluation component 102. The CCR types can be utilized as an input to business relevancy models (described infra) to provide adaptable business relevancy models. The models themselves can be adapted to multiple types of relevancy criteria and/or changes in relevancy criteria over time by adapting how the CCR types are utilized in the business relevancy models. The CCR types provided by the adaptive RV evaluation component 102, however, are not required to change in order to obtain this adaptability.

The adaptive RV evaluation component 102 provides a data independent approach of evaluating the quality of relevancy verification algorithms. This allows an evaluation without typical dependencies on test data sets. It can also reduce subjective tendencies that occur from human interaction with typical relevancy models. A CCR system typically has five types of relationships to choose from that effectively eliminate subjective relevant/non-relevant "stabs" at relevancy utilized by traditional techniques. This reduces human subjectivity to the CCR types rather than to the ultimate decision of relevancy. How the CCR types are utilized/ranked within a business relevancy model can change overtime and/or change within different business models. This allows businesses to alter their perception of relevancy over time, etc. without requiring the adaptive RV evaluation component 102 to re-verify the input 104 based on the changed relevancy model.

Figure 2:
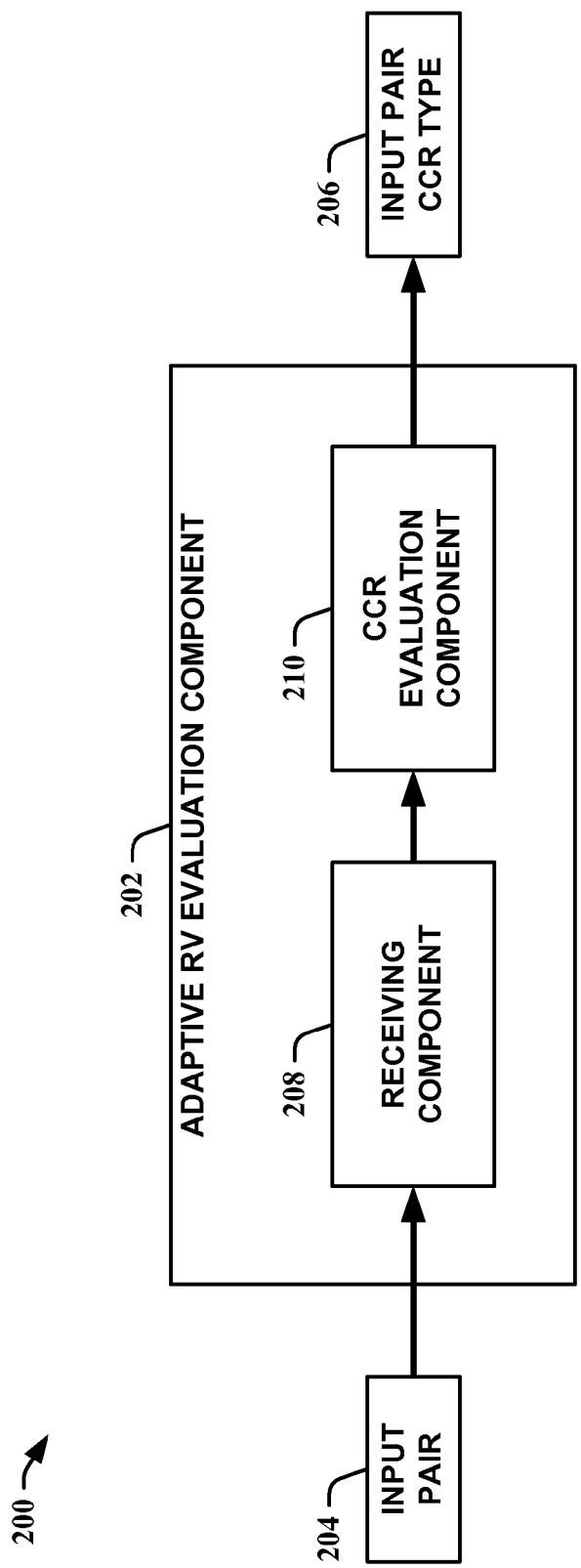
FIG. 2 is another block diagram of an adaptive RV evaluation system in accordance with an aspect of an embodiment.

Referring to FIG. 2, another block diagram of an adaptive RV evaluation system 200 in accordance with an aspect of an embodiment is depicted. The adaptive RV evaluation system 200 is comprised of an adaptive RV evaluation component 202 that obtains an input pair 204 and provides an input pair CCR type 206. The adaptive RV evaluation component 202 is comprised of a receiving component 208 and a CCR evaluation component 210. The input pair 204 is typically comprised of a keyword and an advertising target/entity. The receiving component 208 obtains the input pair 204 for relevancy determination from, for example, an advertising keyword auction entry and the like. The CCR evaluation component 210 receives the input pair 204 from the receiving component 208 and classifies the input pair 204 by utilizing a CCR system with five CCR types. The CCR type classification is output by the CCR evaluation component 210 as the input pair CCR type 206. The classification itself can utilize human interaction and/or machine learning to facilitate the process. Since any human interaction is limited to typing based on the CCR system, subjective impact on relevancy imparted by human counterparts is substantially reduced.

Figure 3:
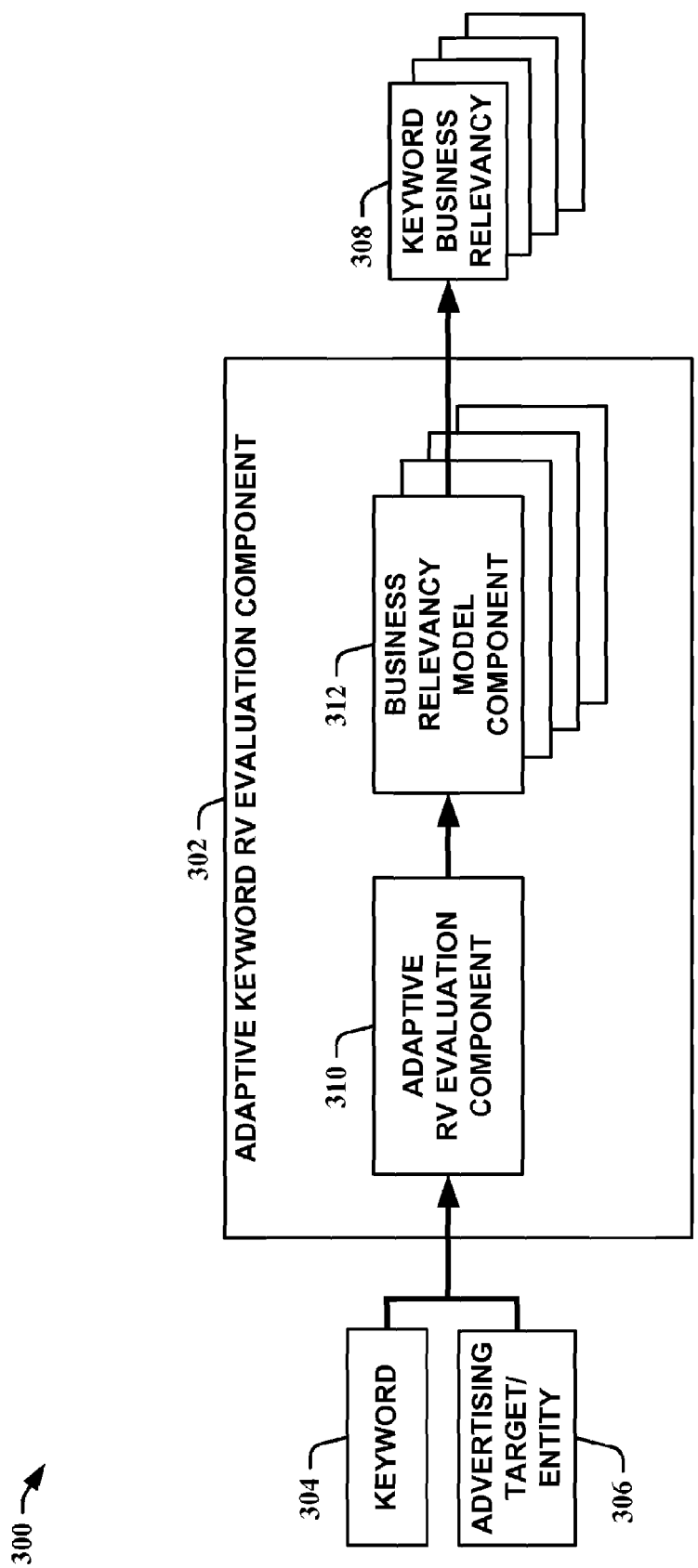
FIG. 3 is a block diagram of an adaptive keyword RV evaluation system in accordance with an aspect of an embodiment.

Looking at FIG. 3, a block diagram of an adaptive keyword RV evaluation system 300 in accordance with an aspect of an embodiment is illustrated. The adaptive keyword RV evaluation system 300 is comprised of an adaptive keyword RV evaluation component 302 that obtains keyword 304 and advertising target/entity 306 and provides a keyword business relevancy 308. The adaptive keyword RV evaluation component 302 is comprised of an adaptive RV evaluation component 310 and a business relevancy model component 312. The adaptive keyword RV evaluation component 302 can also utilize multiple business relevancy model components to provide evaluations of multiple keyword business relevancies. The adaptive RV evaluation component 310 obtains keyword 304 and advertising target/entity 306 and determines a CCR type for the input pair.

The business relevancy model component 312 receives the CCR type and applies an appropriate business relevancy model to facilitate in determining the keyword business relevancy 308. It should be noted that the business relevancy model employed by the business relevancy model component 312 can change over time, and, thus, the keyword business relevancy 308 for the keyword 304 and the advertising target/entity 306 can also change over time given the same CCR type provided by the adaptive RV evaluation component 310. In another instance, multiple business relevancy model components can be employed that can each have different business relevancy models. Thus, the CCR type provided by the adaptive RV evaluation component 310 can be utilized by multiple models (even simultaneously) to provide different keyword business relevancies without requiring the adaptive RV evaluation component 310 to re-determine/verify the CCR type. Thus, the adaptive keyword RV evaluation system 300 can be employed to provide an evaluation of human cognitively derived keyword business relevancies and the like versus algorithmically derived keyword business relevancies.

Figure 4:
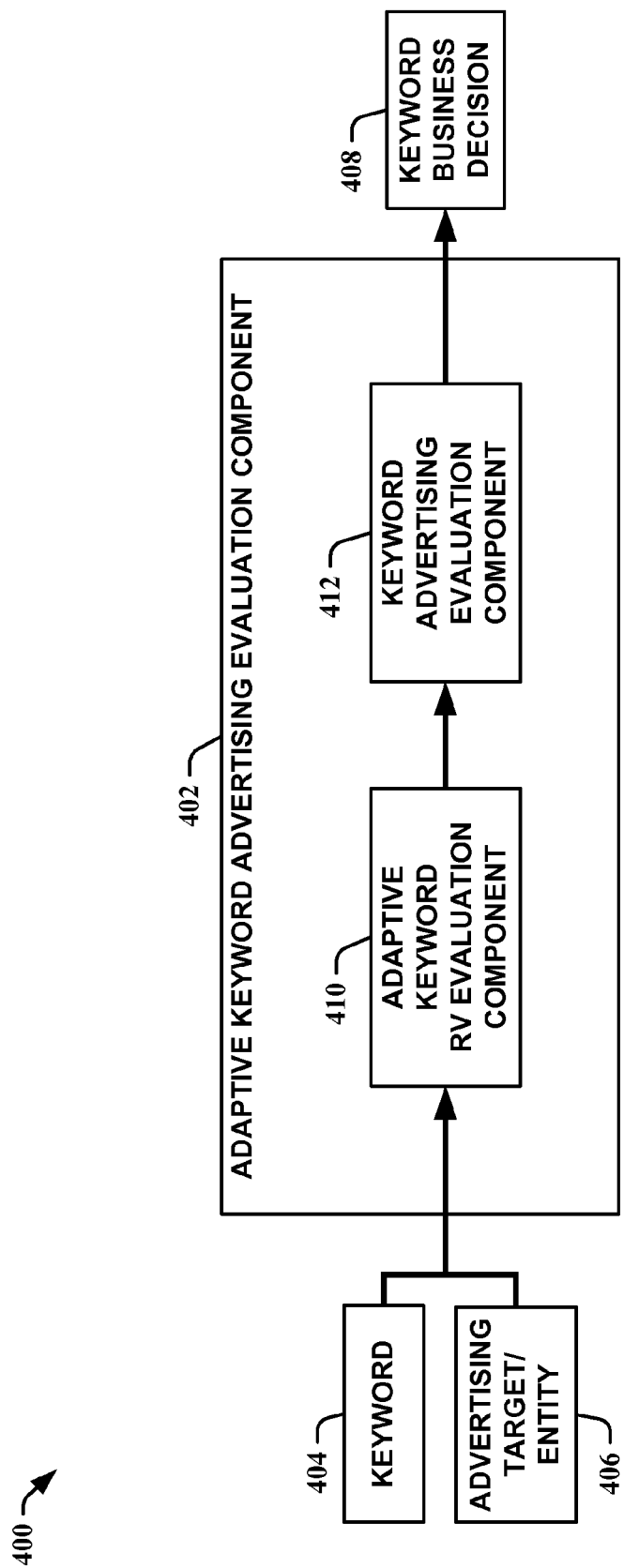
FIG. 4 is a block diagram of an adaptive keyword advertising evaluation system in accordance with an aspect of an embodiment.

Turning to FIG. 4, a block diagram of an adaptive keyword advertising evaluation system 400 in accordance with an aspect of an embodiment is shown. The adaptive keyword advertising evaluation system 400 is comprised of an adaptive keyword advertising evaluation component 402 that obtains a keyword 404 and an advertising target/entity 406 and provides a keyword business decision 408. The adaptive keyword advertising evaluation component 402 is comprised of an adaptive keyword RV evaluation component 410 and a keyword advertising evaluation component 412. The adaptive keyword RV evaluation component 410 obtains a keyword 404 and an advertising target/entity 406. The adaptive keyword RV evaluation component 410 determines a CCR type for the input pair 404/406 and applies an appropriate business relevancy model to determine a business relevancy for the input pair 404/406. The business relevancy model can be supplied by a business and/or provided by the adaptive keyword advertising evaluation component 402. Thus, for example, in an advertising auction setting, a business can select a keyword and provide a business relevancy model and/or just select a keyword and have the auction entity provide an appropriate business relevancy model.

The keyword advertising evaluation component 412 obtains the keyword business relevancy from the adaptive keyword RV evaluation component 410 and provides the keyword business decision 408. The keyword advertising evaluation component 412 essentially determines whether the business relevancy of the keyword 404 is sufficient to allow the business to bid on the keyword 404. The criteria utilized by the keyword advertising evaluation component 412 can be dynamically changed as desired. The keyword advertising evaluation component 412 can be controlled by an auction entity and/or parameters utilized to determine the keyword business decision can be disseminated to advertising entities/businesses so that they can evaluate their own systems for determining whether they are eligible to bid on specific keywords. The substantial flexibility gained by utilizing adaptive relevancy verification, adaptive business models, and/or adaptive keyword business decision models provides for an extremely efficient manner of evaluating keyword relevancies in auctions without requiring re-labeling of data, re-evaluating of a relevancy algorithm, and/or developing multiple relevancy algorithms.

Relevance Verification (RV)

Relevancy verification typically utilizes machine learning algorithms that are trained from test data to build a model. The algorithms then provide relevancy decisions on input pairs based on the learned knowledge in the model obtained from the test data. For example, RV is utilized in keyword-auction based paid search platforms with significant business impact. The role of RV in the auction system is to answer automatically (without human editor review) whether a keyword an advertiser bids on is relevant to an advertisement page they submitted. In this auction system, each keyword/advertisement page pair must go through the RV check. Hence, RV is at the critical path in the paid-search system. Thus, RV is a technical solution that is much more scalable and cost effective than a human review approach. However, to be able to replace human editors, RV must make a correct relevancy judgment substantially similar to a human editor. The challenge is that, given an RV algorithm, how to evaluate the relevancy and to compare algorithmic decisions to human decisions in a measurable way that can be described by a human cognition system.

Furthermore, it takes time and resource to collect test data and build an RV model (so called "model training"). The business environment is ever changing and business standards on relevancy can change over time, and, thus, there can be multiple business relevancy standards that need to applied to the same data input. Therefore, it is most effective if a solution supports varying and multiple relevancy standards from a single RV algorithm without needing to be retrained. Instances of the systems and methods herein provide and RV evaluation solution based on a human cognitive concept relationship that is test data independent. In other instances, an evaluation solution also maps algorithmic decisions to business relevancy standards by such concept relationship, thus eliminating the need for model retraining and/or multiple models.

Traditional RV Evaluation Approach

A traditional method for evaluating an RV algorithm typically consists of the following steps: 1) Human labeling of test data, normally with multiple data sets. Each case is labeled with either "relevant" or "Non-Relevant;" 2) Compare RV algorithmic decisions against human labels; and 3) Report results in accuracy matrices on each data set and across all data cases. Examples of accuracy matrices are illustrated in TABLE 1, shown with two test data sets:

TABLE 1

Traditional Accuracy Matrices

| | Case Count | Human Labeling | |
|---|---|---|---|
| Data Set 1 | 1000 | Relevant | Non-Relevant |
| Algorithmic | Relevant | 70% | 10% |
| Decisions | Non-Relevant | 4% | 16% |
| Data Set 2 | 100 | Relevant | Non-Relevant |
| Algorithmic | Relevant | 40% | 10% |
| Decisions | Non-Relevant | 20% | 30% |
| Total | 1100 | Relevant | Non-Relevant |
| Algorithmic | Relevant | 67% | 10% |
| Decisions | Non-Relevant | 5% | 17% |

Note that values used in TABLE 1 are only for illustrative purposes. Although instances of the systems and methods herein are illustrated with binary outputs (Relevant and Non-Relevant), the systems and methods herein are, however, not restricted with regard to the number of outputs and/or output values. One can see that these two data sets have significant variation on data size and inherent data relevancy differences. To deal with the relevance disparity across data sets, normally, one would report the agreement (corrects) and disagreement (errors) between human labels and machine decisions for each data set (e.g., Data Set 1, Data Set 2), then calculate the accuracy matrix on all test cases combined (e.g., Total).

Problems with Traditional Approach

Problems with this existing approach include:

1) Lack of a common and business-sound evaluation foundation —Without such a foundation, test data quality on relevancy cannot be quantitatively described, and hence it is difficult to control the human labeling accuracy. When a data case is labeled with a decision (either relevant or non-relevant), it is not known why and based on what human decision it is made. Thus, it is common to have two human editors to have different relevancy labels for the same case.

2) Machine relevancy evaluation is tied to and thus not independent of relevancy quality of the test data—The traditional approach is to report algorithm output quality by comparing to a human output for each individual test set (but exactly what does each data set indicate), and also to report the same for all cases combined as a summary. It is difficult to objectively and independently assess algorithm accuracy in this way.

3) Difficult to change business relevancy decisions by varying or multiple business needs—For example, there are two business applications that have different relevancy needs. The first application will not give a relevant decision until two inputs are talking about the same thing. The second application, however, does not need such a strict relevancy standard. It will output a relevant decision unless the two inputs have nothing to do with each other. Or the same business application will have varying relevancy standard over time. All these requirements cannot be met by traditional approaches of relevance evaluation that are tied to data sets themselves. It would require re-labeling and mobile retraining when business relevancy standard changes, or require building of multiple models, each serving a different business relevancy standard.

Adaptable Approach

Instances of the systems and methods herein allow a selection of a cognitive concept relationship (CCR) system as the basis for relevance evaluation. This is a business-sound foundation that is quantitative and descriptive. The instances can also provide human classification of test cases into the CCR system. This step categorizes test cases by CCR type, breaking the set boundaries of the data. By doing this, test-data-independent relevance evaluation is enabled. Measurement of algorithmic accuracy is also accomplished by a CCR system. Thus, instead of measuring the algorithmic relevancy by each data set (vertical evaluation), it is measured in each CCR type (horizontal evaluation), which is based on human cognition and independent of relevancy quality of test data. This provides adaptive business relevancy decision making. The business relevance decision standard is described on the same CCR system, therefore, algorithmic outputs can be mapped to the business standard directly. Instances of the systems and methods herein can naturally support any number of business applications with different relevance standards and supports changes in the business relevance standard over time, without the need to either human re-label the data or re-measure the algorithmic relevancy.

Adaptable Methods

Instances disclosed herein can employ some or all of the following steps (described in detail infra):

1. Use cognitive concept relationship (CCR) system as relevancy evaluation foundation
2. Human classify test data into CCR
3. Quantitatively measure algorithmic relevancy by CCR system
4. Map algorithmic output to business relevancy decisions by CCR system Use of Cognitive Concept Relationship (CCR) Types as Relevancy Evaluation foundation There are altogether five types of cognitive concept relationship between a pair of inputs as shown in TABLE 2:

TABLE 2

Cognitive Concept Relationship

| Type | Input (a, b) Relationship | Example |
|---|---|---|
| 0 | A and b are the same | a = personal computer<br>b = PC |
| 1 | A is a superset of b | a = electronics<br>b = TV |
| 2 | A is a subset of b | a = TV<br>b = electronics |
| 3 | A and b overlap | a = HP printer (including cartridge)<br>b = printer cartridges for all brands |
| 4 | A and b belong disjoint concept categories | a = software<br>b = apparel |

Figure 5:
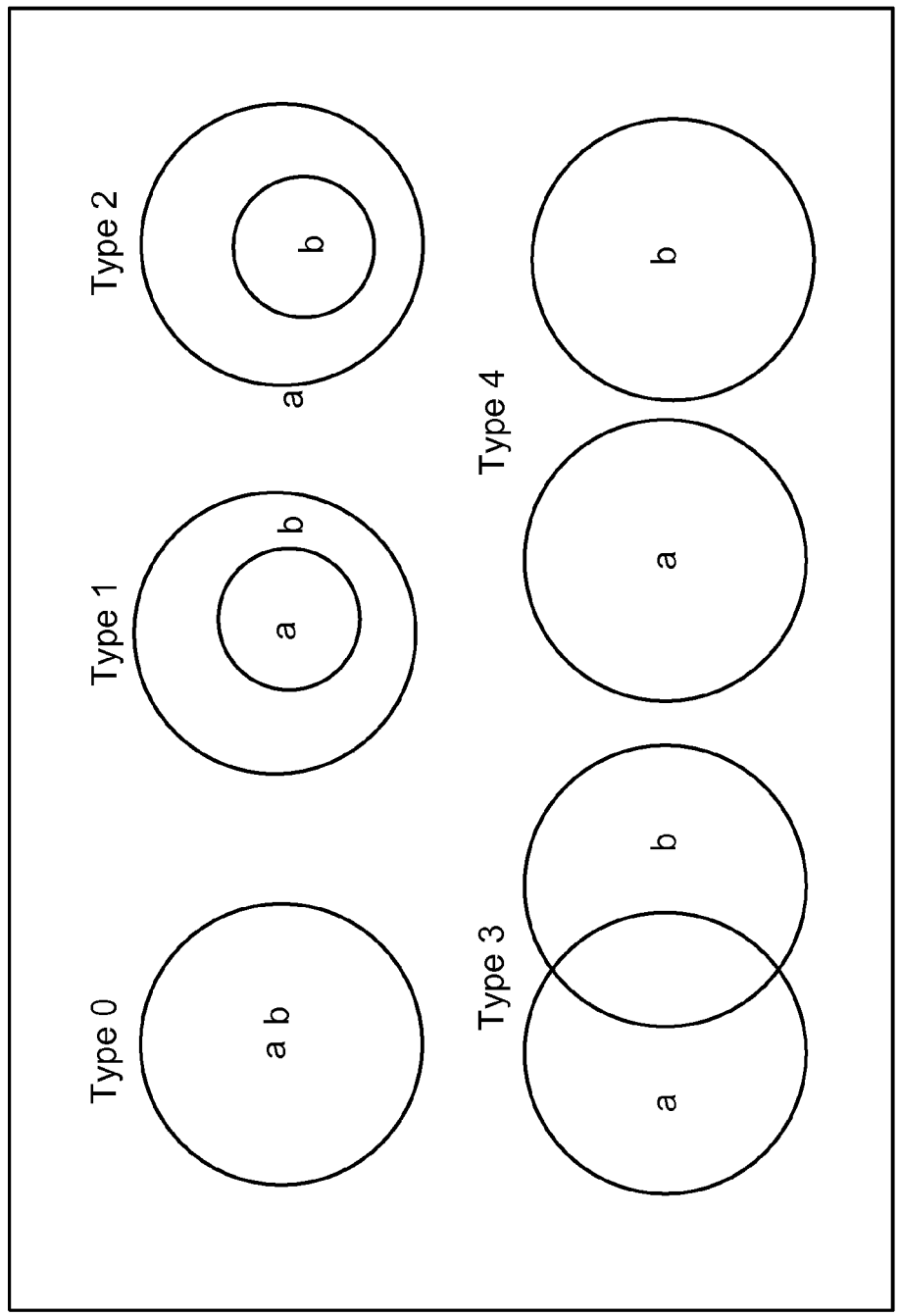
FIG. 5 is an illustration of cognitive concept relationships in accordance with an aspect of an embodiment.

Generally speaking, the relevancy of two inputs decreases as the type number increases. Graphically, these types of cognitive concept relationship (CCR) can be visualized as shown in the illustration 500 of FIG. 5. The CCR system quantitatively describes the relevancy of any two inputs.

Human CCR Classification of Test Data

Figure 6:
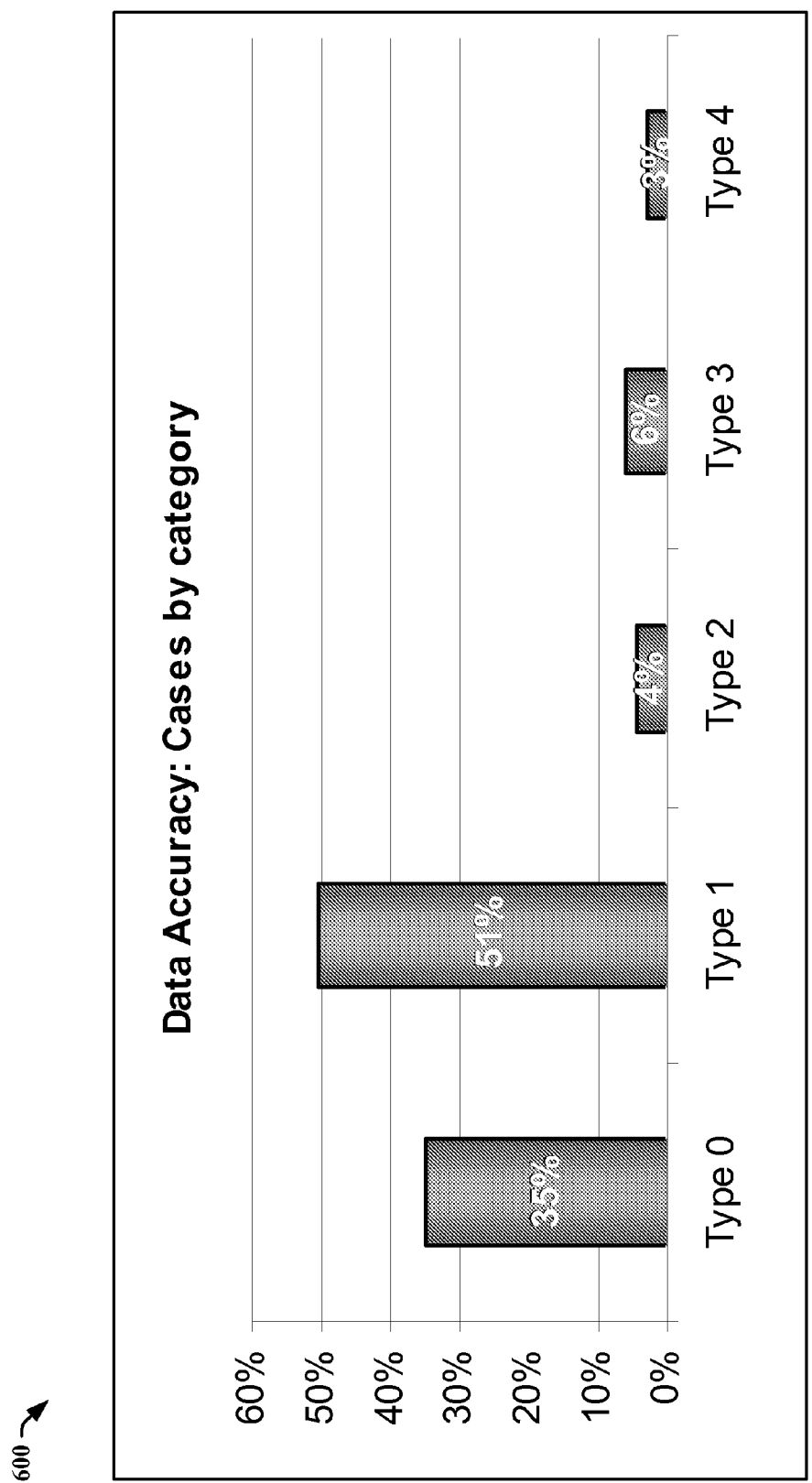
FIG. 6 is a graph of an example distribution of test data with multiple sets by CCR type in accordance with an aspect of an embodiment.

The data labeling becomes a human classification exercise, classifying each data case (containing two inputs) into one of the five types. In this step, the data set boundary is broken and five types of test data are generated by the human cognitive concept relationship. Once data is labeled by CCR types, variances in given data such as relevancy and size disparity across sets are irrelevant to RV evaluation. FIG. 6 is a graph 600 that shows an example distribution of test data with multiple sets by CCR type.

The traditional approach, where human labeling simply outputs Relevant or Non-Relevant on an individual test case basis, is difficult to quantify, explain and quality control. Also, once a relevancy decision is made, it cannot be changed when a business relevancy decision standard is updated. In the case when business relevancy standard changes, the test data must be re-labeled. Also, it is difficult to quantitatively explain to human reviewers what is Relevant and what is Non-Relevant without such a category system such as the CCR. In instances of the systems and methods herein, human editors are simply asked to classify pairs of inputs in test data into the CCR system, which is very straightforward and allows easier control of the label quality. The relevancy decision making is delayed to the last step of the solution, varying business relevancy standards can be supported.

Measuring Algorithmic Accuracy in CCR

Figure 7:
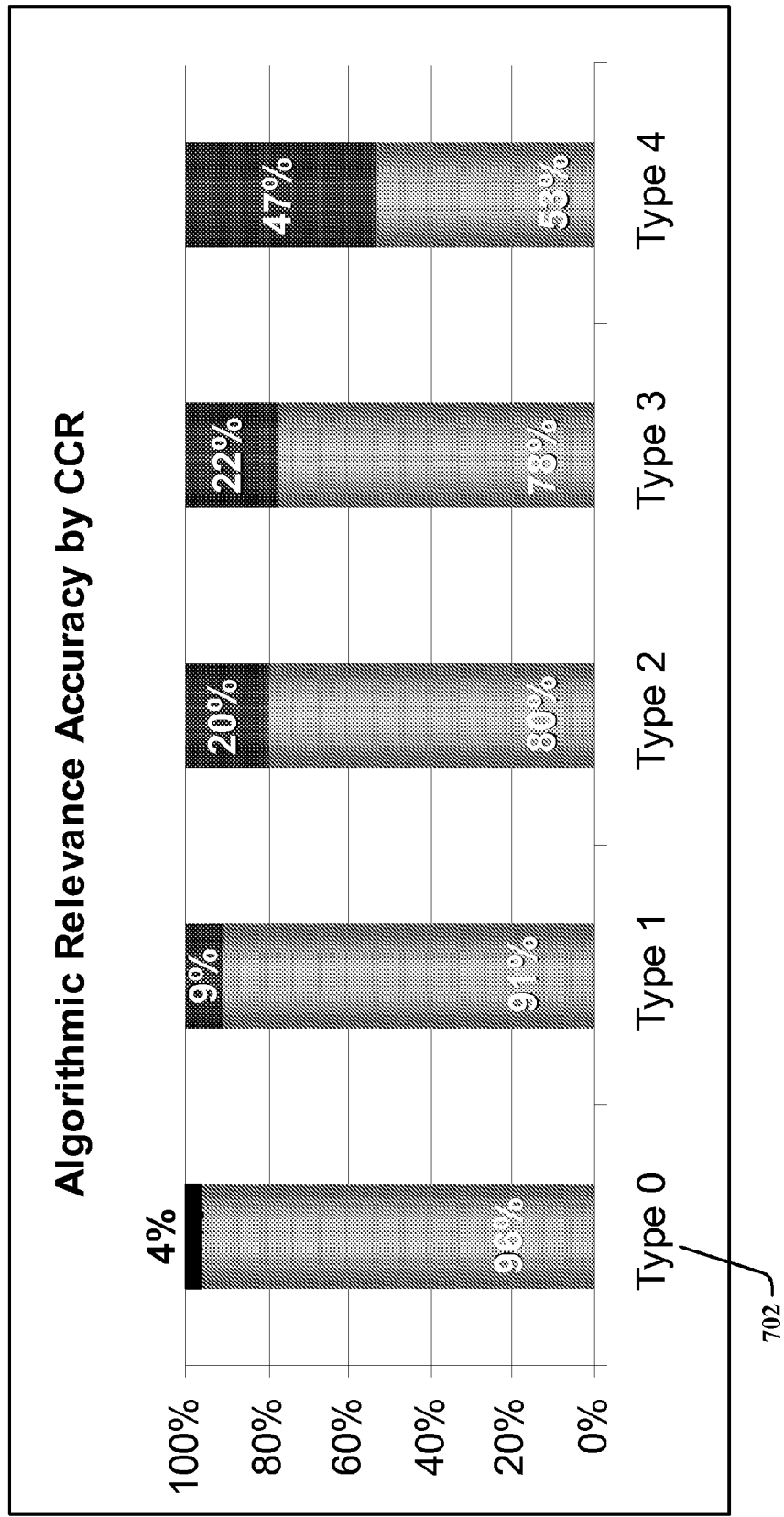
FIG. 7 is a graph of an example output of the accuracy of an RV machine system by CCR in accordance with an aspect of an embodiment.

Instead of utilizing a data set, machine accuracy is now measured by CCR type using the classified data from the above step for each type. The evaluation is, therefore, quantitatively descriptive and independent of given test data quality. The graph 700 in FIG. 7 shows an example output of the accuracy of an RV machine system by CCR. This graph 700 tells that for Type 0 (where two inputs are about the same concept from human labeling) 702, the RV algorithm is 96% accurate, i.e., in 100 Type-0 cases RV is correct 96 times. In this step, the accuracy of the RV algorithm is quantitatively measured in each CCR type. The results are described by CCR instead of by individual data sets. Again, business relevancy decision making is delayed to a subsequent step.

Mapping Algorithmic Output to Business Relevancy Decisions by CCR

With algorithm results described by CCR, algorithmic output can be directly mapped to business relevancy decisions in the CCR system. TABLE 3 illustrates such a mapping, assuming two business applications that have different relevancy standards.

TABLE 3

Algorithmic Output Mapping

| Business Application | Business Relevancy Needs | CCR Types to Business Decision | | Algorithmic Accuracy on Business Relevancy | |
|---|---|---|---|---|---|
| | | Relevant | Non-Relevant | Relevant | Non-Relevant |
| App. 1 | Strict | 0 | 1, 2, 3, 4 | 96% | 13% |
| App. 2 | Loose | 0, 1, 2, 3 | 4 | 92% | 47% |

First, the business relevancy needs are quantified to CCR. For example, "Strict" from App. 1 is translated into the following:
  1. Relevant includes CCR Type 0,
  2. Non-Relevant includes CCR Types 1 to 4.

Next, the algorithmic relevancy is quantified, based on the business relevancy to CCR mapping and the algorithmic relevancy accuracy in each CCR type.

The evaluated Business Relevant accuracy (BRA) of the algorithm is as follows:

$$BRA = \frac{\text{Sum of cases with algorithmic output} = \text{Relevant across business Relevant } CCR \text{ types}}{\text{Sum of all cases across business Relevant } CCR \text{ types}} \quad (\text{Eq. 1})$$

As an example: the BRA for Application #1 is:

$$\frac{96\% \times 35\% \times NumAllCases}{35\% \times NumAllCases} = 96\%$$

The evaluated Business Non-Relevant accuracy (BNRA) of the algorithm is calculated as follows:

$$BNRA = \frac{\text{Sum of cases with algorithmic output} = \text{Non-Relevant across business Non-Relevant } CCR \text{ types}}{\text{Sum of all cases across business Non-Relevant } CCR \text{ types}} \quad (\text{Eq. 2})$$

As an example: the BNRA for Application #1 is calculated as:

$$\frac{9\% \times 51\% \times NumAllCases + 20\% \times 4\% \times NumAllCases + 22\% \times 6\% \times NumAllCases + 47\% \times 3\% \times NumAllCases}{51\% \times NumAllCases + 4\% \times NumAllCases + 6\% \times NumAllCases + 3\% \times NumAllCases} = 13\%$$

BRA and BNRA, respectively, indicate how accurately (agreeability with humans) for cases that are relevant and non-relevant by the given business standards. The evaluation solution provided herein can also report on error rates for business Relevant and business Non-Relevant categories, which are simply 1-BRA and 1-BNRA, respectively. From this, it is shown that a single RV algorithm can directly support multiple business applications with different relevancy standards and/or the same business application with varying relevancy standard over time, without needs for data re-labeling, algorithm retraining, and/or re-evaluation. This is achieved by mapping business relevancy standards to the given CCR type system, taking full advantage of the disjoint and different relevancy relationship in human cognition. Then, the NRA and BNRA are calculated from algorithmic accuracy measures in member CCR types to Business Relevant and Business Non-Relevant categories. Similar evaluation algorithms can also be employed to further evaluate accuracies of keyword business relevancy models and/or keyword advertising models.

Figure 8:
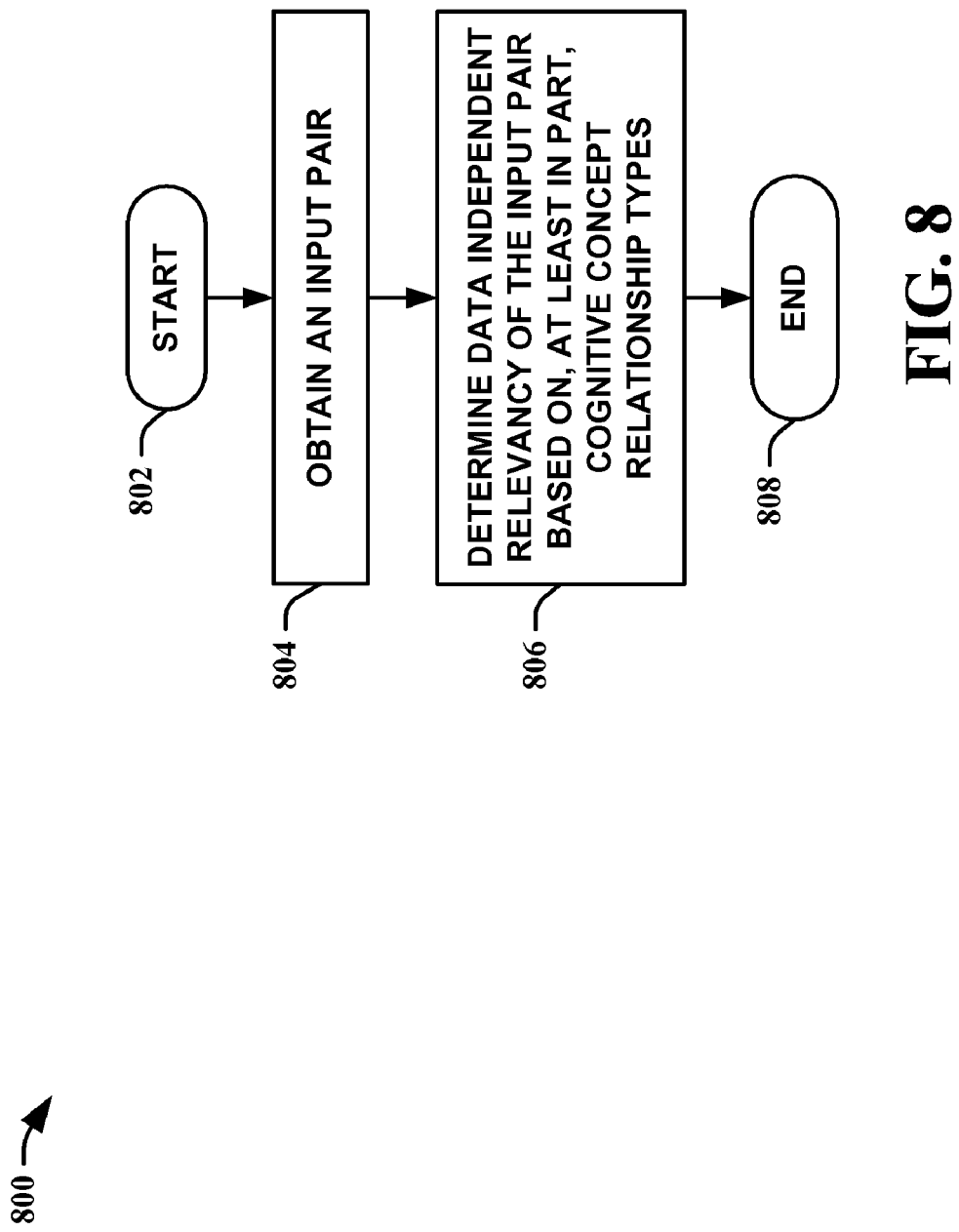
FIG. 8 is a flow diagram of a method of facilitating RV evaluation in accordance with an aspect of an embodiment.
Figure 9:
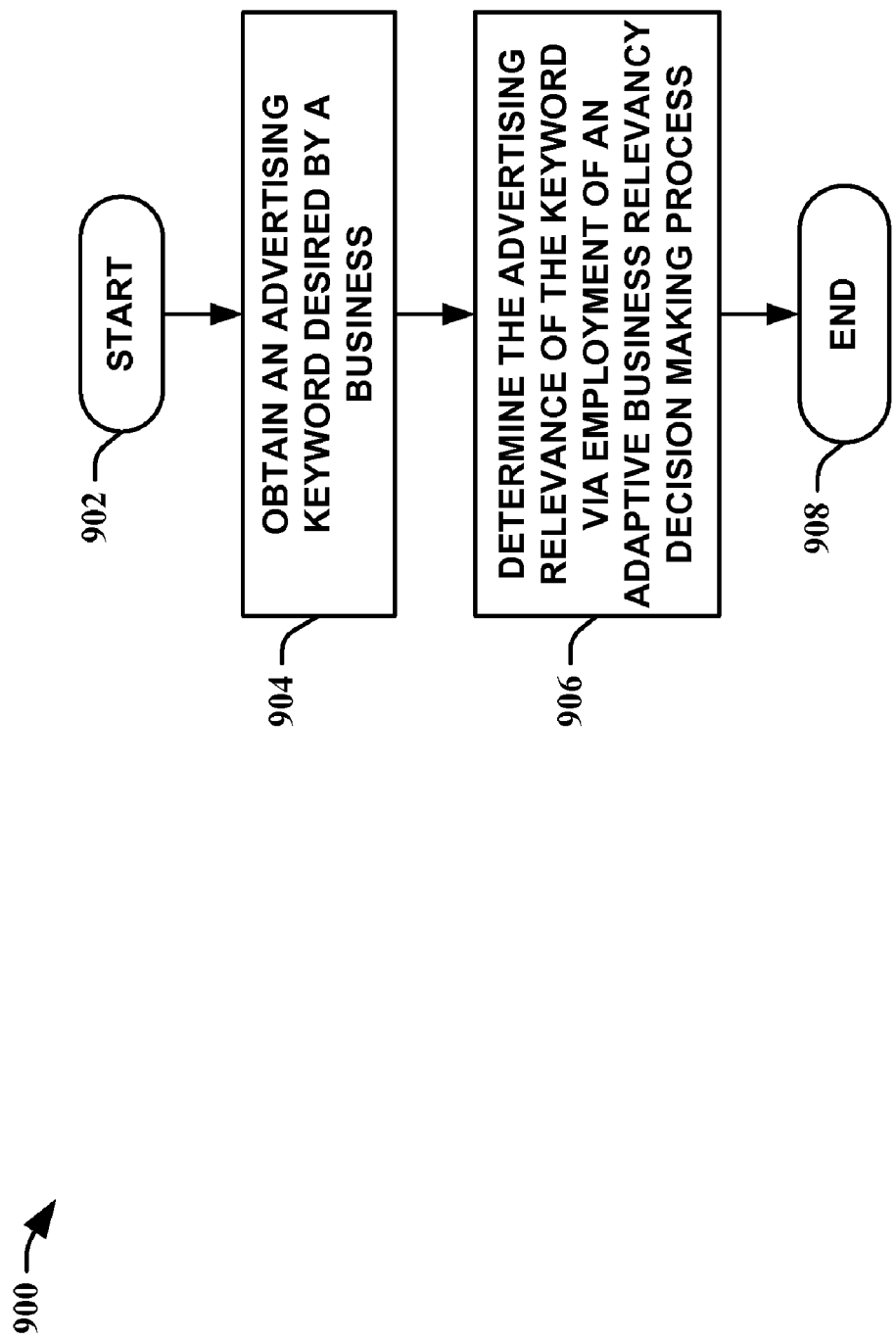
FIG. 9 is a flow diagram of a method of adaptively facilitating business relevancy decision making in accordance with an aspect of an embodiment.
Figure 10:
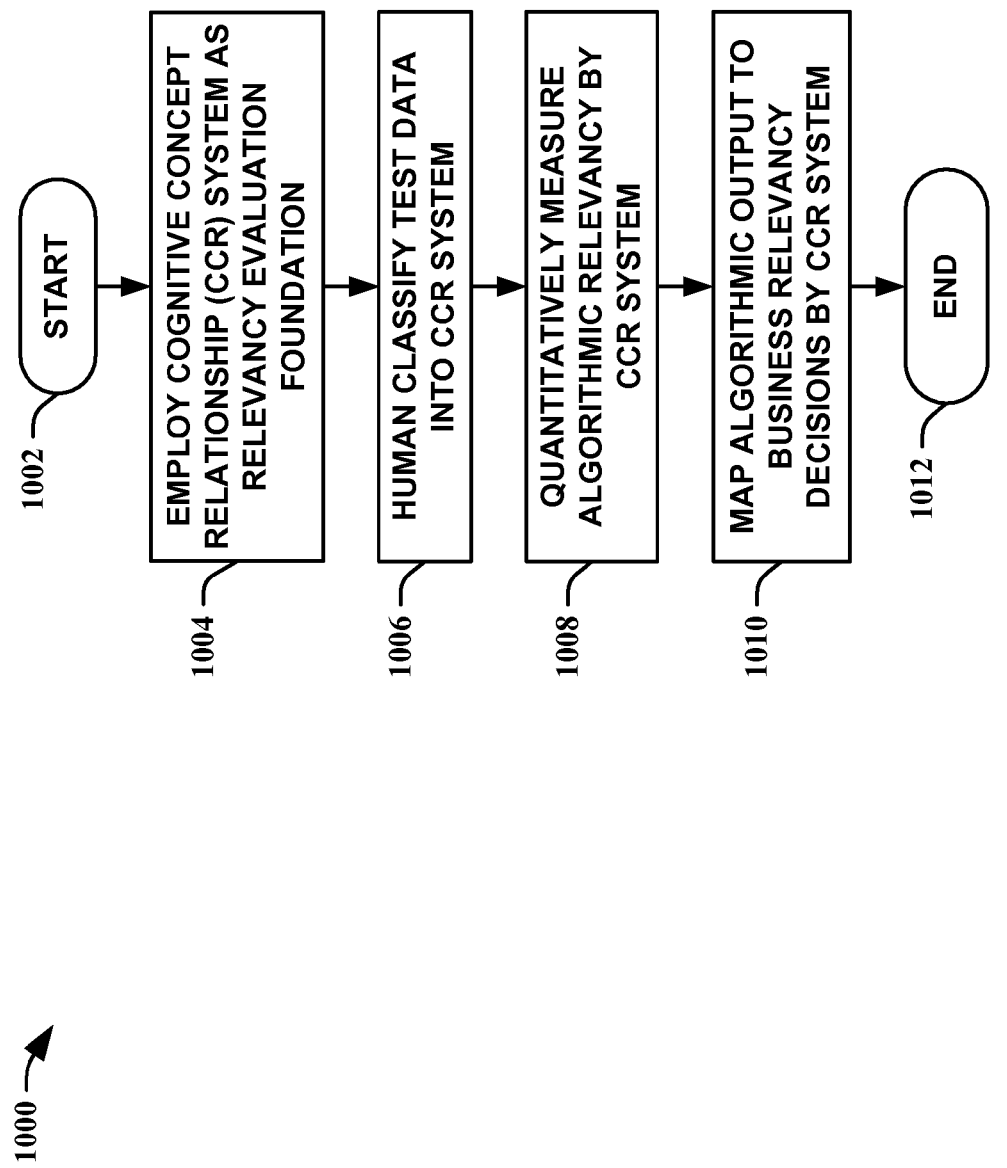
FIG. 10 is another flow diagram of a method of facilitating RV evaluation in accordance with an aspect of an embodiment.

In view of the exemplary systems shown and described above, methodologies that may be implemented in accordance with the embodiments will be better appreciated with reference to the flow charts of FIGS. 8-10. While, for purposes of simplicity of explanation, the methodologies are shown and described as a series of blocks, it is to be understood and appreciated that the embodiments are not limited by the order of the blocks, as some blocks may, in accordance with an embodiment, occur in different orders and/or concurrently with other blocks from that shown and described herein. Moreover, not all illustrated blocks may be required to implement the methodologies in accordance with the embodiments.

The embodiments may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various instances of the embodiments.

In FIG. 8, a flow diagram of a method 800 of facilitating RV evaluation in accordance with an aspect of an embodiment is shown. The method 800 starts 802 by obtaining an input pair 804. The input pair can be comprised of an advertising keyword and an advertising target (e.g., particular product and/or product line promoted by an advertising webpage, webpage advertisement, banner, etc.) and/or entity (e.g., business rather than a particular advertising target, etc.). Data independent relevancy of the input pair is then determined based on, at least in part, cognitive concept relationship types 806, ending the flow 808. The CCR types can be utilized as an input to business relevancy models to provide adaptable business relevancy models. The models themselves can be adapted to multiple types of relevancy criteria and/or changes in relevancy criteria over time by adapting how the CCR types are utilized in the business relevancy models. The CCR types, however, are not required to change in order to obtain this adaptability.

Turning to FIG. 9, a flow diagram of a method 900 of adaptively facilitating business relevancy decision making in accordance with an aspect of an embodiment is depicted. The method 900 starts 902 by obtaining an advertising keyword desired by a business 904. The advertising relevance of the keyword is then determined via employment of an adaptive business relevancy decision making process 906, ending the flow 908. This allows evaluation of advertising relevance utilizing an adaptive business relevancy decision making process that can employ a CCR system. Thus, comparisons between algorithmic and human cognitive approaches can be easily obtained.

Looking at FIG. 10, another flow diagram of a method 1000 of facilitating RV evaluation in accordance with an aspect of an embodiment is illustrated. The method 1000 starts 1002 by employing cognitive concept relationship (CCR) system as a relevancy evaluation foundation 1004. A CCR system includes five types of relationships as shown supra in TABLE 2. Relevancy typically decreases as the type number increases. See FIG. 5 for a graphical illustration 500. The CCR system allows the relevancy to be quantitatively described. Test data is then human classified into the CCR system 1006. This breaks the data set boundary and five types of test data are generated by the human cognitive concept relationship. Once data is labeled by CCR types, variances in given data such as relevancy and size disparity across sets are irrelevant to RV evaluation. For example, human editors can simply be asked to classify pairs of inputs in test data into the CCR system, which is straightforward and allows easier control of the label quality. This delays the relevancy decision making, allowing varying business relevancy standards to be supported.

Algorithmic relevancy is then quantitatively measured by the CCR system 1008. Instead of utilizing a data set as in traditional approaches, machine accuracy is measured by CCR type utilizing the classified data for each type. The evaluation is, therefore, quantitatively descriptive and independent of given test data quality. Algorithmic output is then mapped to business relevancy decisions by CCR system 1010, ending the flow 1012. With algorithm results described by CCR, algorithmic output can be directly mapped to business relevancy decisions in a CCR system. First, the business relevancy needs are quantified to CCR. Next, the algorithmic relevancy is quantified, based on the business relevancy to CCR mapping and the algorithmic relevancy accuracy in each CCR type. Thus, a single RV process can directly support multiple business applications with different relevancy standards and/or the same business application with varying relevancy standard over time, without needs for data re-labeling, algorithm retraining, and/or re-evaluation. This is achieved by mapping business relevancy standards to the given CCR type system, taking full advantage of the disjoint and different relevancy relationship in human cognition. Then, the NRA and BNRA are calculated from algorithmic accuracy measures in member CCR types to Business Relevant and Business Non-Relevant categories. Similar evaluation algorithms can also be employed to further evaluate accuracies of keyword business relevancy models and/or keyword advertising models.

Figure 11:
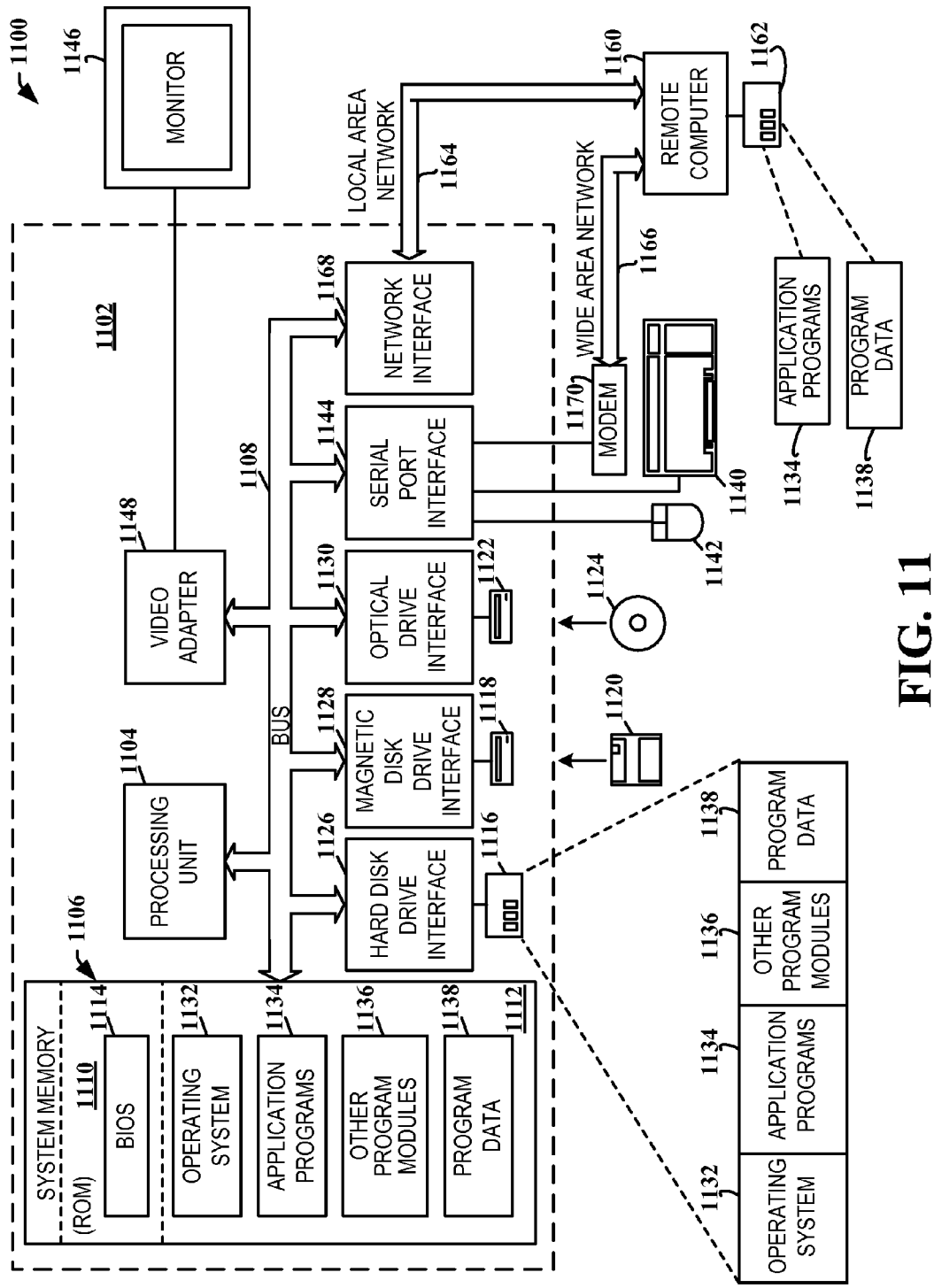
FIG. 11 illustrates an example operating environment in which an embodiment can function.

In order to provide additional context for implementing various aspects of the embodiments, FIG. 11 and the following discussion is intended to provide a brief, general description of a suitable computing environment 1100 in which the various aspects of the embodiments can be performed. While the embodiments have been described above in the general context of computer-executable instructions of a computer program that runs on a local computer and/or remote computer, those skilled in the art will recognize that the embodiments can also be performed in combination with other program modules. Generally, program modules include routines, programs, components, data structures, etc., that perform particular tasks and/or implement particular abstract data types. Moreover, those skilled in the art will appreciate that the inventive methods can be practiced with other computer system configurations, including single-processor or multi-processor computer systems, minicomputers, mainframe computers, as well as personal computers, hand-held computing devices, microprocessor-based and/or programmable consumer electronics, and the like, each of which can operatively communicate with one or more associated devices. The illustrated aspects of the embodiments can also be practiced in distributed computing environments where certain tasks are performed by remote processing devices that are linked through a communications network. However, some, if not all, aspects of the embodiments can be practiced on stand-alone computers. In a distributed computing environment, program modules can be located in local and/or remote memory storage devices.

With reference to FIG. 11, an exemplary system environment 1100 for performing the various aspects of the embodiments include a conventional computer 1102, including a processing unit 1104, a system memory 1106, and a system bus 1108 that couples various system components, including the system memory, to the processing unit 1104. The processing unit 1104 can be any commercially available or proprietary processor. In addition, the processing unit can be implemented as multi-processor formed of more than one processor, such as can be connected in parallel.

The system bus 1108 can be any of several types of bus structure including a memory bus or memory controller, a peripheral bus, and a local bus using any of a variety of conventional bus architectures such as PCI, VESA, Microchannel, ISA, and EISA, to name a few. The system memory 1106 includes read only memory (ROM) 1110 and random access memory (RAM) 1112. A basic input/output system (BIOS) 1114, containing the basic routines that help to transfer information between elements within the computer 1102, such as during start-up, is stored in ROM 1110.

The computer 1102 also can include, for example, a hard disk drive 1116, a magnetic disk drive 1118, e.g., to read from or write to a removable disk 1120, and an optical disk drive 1122, e.g., for reading from or writing to a CD-ROM disk 1124 or other optical media. The hard disk drive 1116, magnetic disk drive 1118, and optical disk drive 1122 are connected to the system bus 1108 by a hard disk drive interface 1126, a magnetic disk drive interface 1128, and an optical drive interface 1130, respectively. The drives 1116-1122 and their associated computer-readable media provide nonvolatile storage of data, data structures, computer-executable instructions, etc. for the computer 1102. Although the description of computer-readable media above refers to a hard disk, a removable magnetic disk and a CD, it should be appreciated by those skilled in the art that other types of media which are readable by a computer, such as magnetic cassettes, flash memory, digital video disks, Bernoulli cartridges, and the like, can also be used in the exemplary operating environment 1100, and further that any such media can contain computer-executable instructions for performing the methods of the embodiments.

A number of program modules can be stored in the drives 1116-1122 and RAM 1112, including an operating system 1132, one or more application programs 1134, other program modules 1136, and program data 1138. The operating system 1132 can be any suitable operating system or combination of operating systems. By way of example, the application programs 1134 and program modules 1136 can include a relevance verification evaluation scheme in accordance with an aspect of an embodiment.

A user can enter commands and information into the computer 1102 through one or more user input devices, such as a keyboard 1140 and a pointing device (e.g., a mouse 1142). Other input devices (not shown) can include a microphone, a joystick, a game pad, a satellite dish, a wireless remote, a scanner, or the like. These and other input devices are often connected to the processing unit 1104 through a serial port interface 1144 that is coupled to the system bus 1108, but can be connected by other interfaces, such as a parallel port, a game port or a universal serial bus (USB). A monitor 1146 or other type of display device is also connected to the system bus 1108 via an interface, such as a video adapter 1148. In addition to the monitor 1146, the computer 1102 can include other peripheral output devices (not shown), such as speakers, printers, etc.

It is to be appreciated that the computer 1102 can operate in a networked environment using logical connections to one or more remote computers 1160. The remote computer 1160 can be a workstation, a server computer, a router, a peer device or other common network node, and typically includes many or all of the elements described relative to the computer 1102, although for purposes of brevity, only a memory storage device 1162 is illustrated in FIG. 11. The logical connections depicted in FIG. 11 can include a local area network (LAN) 1164 and a wide area network (WAN) 1166. Such networking environments are commonplace in offices, enterprise-wide computer networks, intranets and the Internet.

When used in a LAN networking environment, for example, the computer 1102 is connected to the local network 1164 through a network interface or adapter 1168. When used in a WAN networking environment, the computer 1102 typically includes a modem (e.g., telephone, DSL, cable, etc.) 1170, or is connected to a communications server on the LAN, or has other means for establishing communications over the WAN 1166, such as the Internet. The modem 1170, which can be internal or external relative to the computer 1102, is connected to the system bus 1108 via the serial port interface 1144. In a networked environment, program modules (including application programs 1134) and/or program data 1138 can be stored in the remote memory storage device 1162. It will be appreciated that the network connections shown are exemplary and other means (e.g., wired or wireless) of establishing a communications link between the computers 1102 and 1160 can be used when carrying out an aspect of an embodiment.

In accordance with the practices of persons skilled in the art of computer programming, the embodiments have been described with reference to acts and symbolic representations of operations that are performed by a computer, such as the computer 1102 or remote computer 1160, unless otherwise indicated. Such acts and operations are sometimes referred to as being computer-executed. It will be appreciated that the acts and symbolically represented operations include the manipulation by the processing unit 1104 of electrical signals representing data bits which causes a resulting transformation or reduction of the electrical signal representation, and the maintenance of data bits at memory locations in the memory system (including the system memory 1106, hard drive 1116, floppy disks 1120, CD-ROM 1124, and remote memory 1162) to thereby reconfigure or otherwise alter the computer system's operation, as well as other processing of signals. The memory locations where such data bits are maintained are physical locations that have particular electrical, magnetic, or optical properties corresponding to the data bits.

Figure 12:
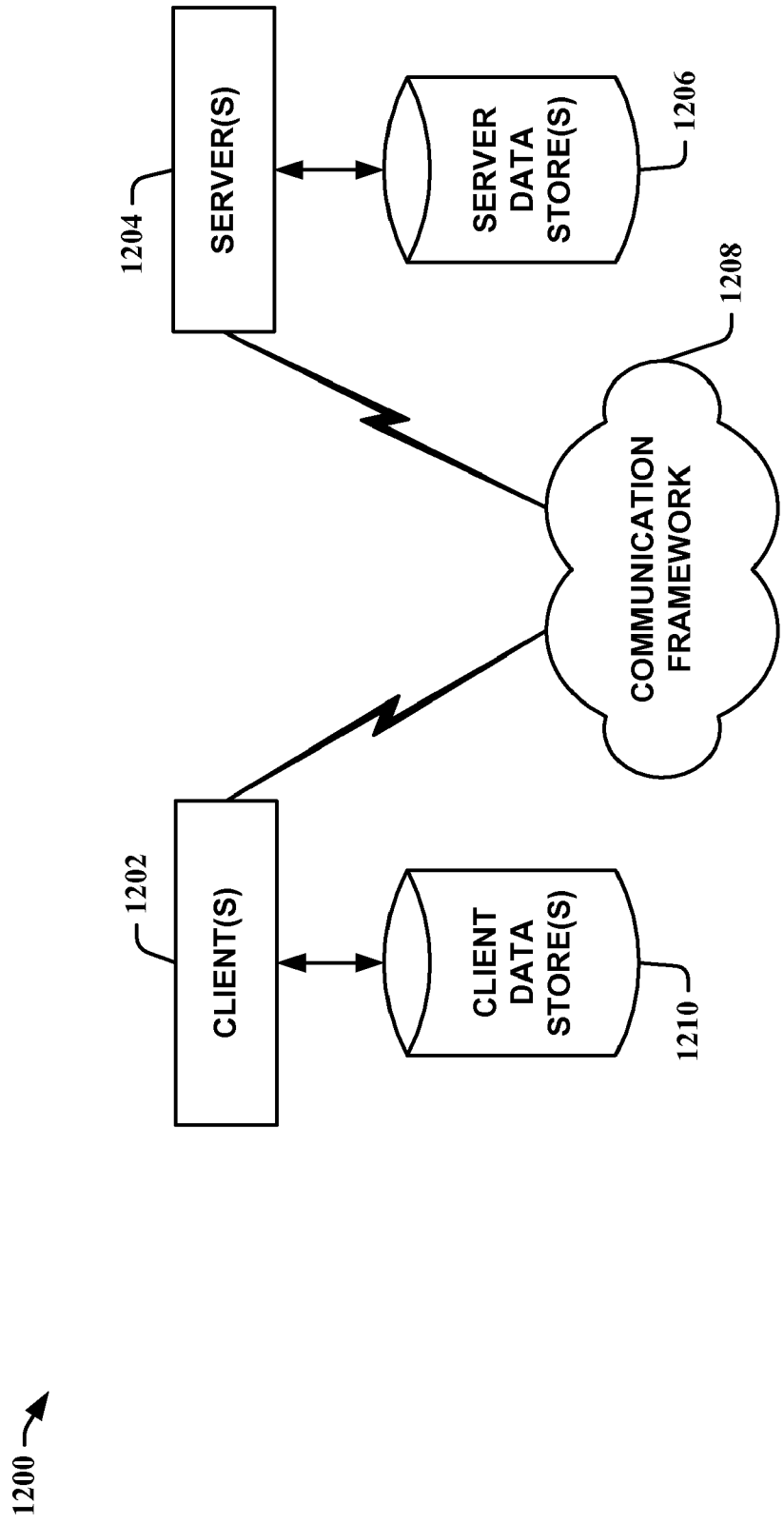
FIG. 12 illustrates another example operating environment in which an embodiment can function.

FIG. 12 is another block diagram of a sample computing environment 1200 with which embodiments can interact. The system 1200 further illustrates a system that includes one or more client(s) 1202. The client(s) 1202 can be hardware and/or software (e.g., threads, processes, computing devices). The system 1200 also includes one or more server(s) 1204. The server(s) 1204 can also be hardware and/or software (e.g., threads, processes, computing devices). One possible communication between a client 1202 and a server 1204 can be in the form of a data packet adapted to be transmitted between two or more computer processes. The system 1200 includes a communication framework 1208 that can be employed to facilitate communications between the client(s) 1202 and the server(s) 1204. The client(s) 1202 are connected to one or more client data store(s) 1210 that can be employed to store information local to the client(s) 1202. Similarly, the server(s) 1204 are connected to one or more server data store(s) 1206 that can be employed to store information local to the server(s) 1204.

It is to be appreciated that the systems and/or methods of the embodiments can be utilized in relevance verification evaluation facilitating computer components and non-computer related components alike. Further, those skilled in the art will recognize that the systems and/or methods of the embodiments are employable in a vast array of electronic related technologies, including, but not limited to, computers, servers and/or handheld electronic devices, and the like.

What has been described above includes examples of the embodiments. It is, of course, not possible to describe every conceivable combination of components or methodologies for purposes of describing the embodiments, but one of ordinary skill in the art may recognize that many further combinations and permutations of the embodiments are possible. Accordingly, the subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates relevancy verification evaluation of data item pairs for business applications, the system comprising:
    a memory for storing data; and
    a processor coupled to the memory configured to act as:
    a receiving component that obtains an input data item pair for relevancy evaluation; and
    an evaluation component that employs an evaluation system to classify the input data item pair into a cognitive concept relationship (CCR) type indicating a determined relationship between respective input data items within the input data item pair, the CCR type being selected from a set of CCR types based on the determined relationship between respective input data items within the input data item pair, to obtain a mapping relationship between business relevancy decisions and respective CCR types based on a business relevancy standard, and to facilitate a relevancy evaluation of the input data item pair by mapping the selected CCR type into which the input data item pair is classified to a business relevancy decision corresponding to the selected CCR type based on the obtained mapping relationship, wherein the relevancy evaluation is conducted independent of the input data item pair.

2. The system of claim 1, the input data item pair is associated with an advertising keyword and one of an advertising target or an advertising entity.

3. The system of claim 1, the evaluation component utilizes a cognitive concept relationship (CCR) system to facilitate classification of the input data pair.

4. The system of claim 3, the CCR system employs human classification of test cases.

5. The system of claim 3, the evaluation component provides a measurement of algorithmic relevancy accuracy.

6. The system of claim 1 further comprising:
    a business model component that performs a relevancy evaluation based on the set of cognitive CCR types to adaptively determine relevance of a keyword in relation to a business model, wherein the business model maps each CCR type to a relevancy decision that specifies the keyword to be one of relevant or non-relevant.

7. The system of claim 6 further comprising:
    an advertising component that determines a business advertising decision for the keyword based on the relevancy evaluation performed by the business model component.

8. The system of claim 1, the evaluation component supports multiple business relevancy standards concurrently without requiring retraining of the evaluation component for the respective business relevancy standards.

9. The system of claim 1, wherein the system is implemented in an advertising keyword auction system.

10. A method for facilitating relevancy verification evaluation of a data item pair, comprising:
    employing a processor executing computer-executable instructions stored on a computer-readable storage medium to implement the following acts:
    obtaining an input data item pair to be evaluated for relevance;
    utilizing a cognitive concept relationship (CCR) system to associate the input data item pair with one or more CCR types that indicate a determined relationship between respective input data items within the input data item pair associated with the CCR system based on the determined relationship between respective data items of the input data item pair;
    applying a first business relevancy standard to map the CCR types associated with the CCR system to a first set of respective business relevancy decisions independent of the input data item pair and algorithmic relevance verification training data;
    applying a second business relevancy standard disparate from the first business relevancy standard to map the CCR types associated with the CCR system to a second set of respective business relevancy decisions independent of the input data item pair and algorithmic relevance verification training data; and
    evaluating relevancy of the input data item pair according to the first business relevancy standard and the second business relevancy standard by determining at least one business relevancy decision from the first set of business relevancy decisions and at least one business relevancy decision from the second set of business relevancy decisions that are mapped to the one or more CCR types associated with the input data item pair independently of the respective data items of the input data item pair, the business relevancy decisions specify the input data item pair to be one of relevant or non-relevant based upon the CCR types.

11. The method of claim 10, the input data item pair comprises a first data item associated with an advertising keyword and a second data item associated with one or more of an advertising entity or a target.

12. The method of claim 10 further comprising:
    employing test cases for the CCR system that are classified by humans and categorizing the test cases by CCR type.

13. The method of claim 10 further comprising:
    utilizing the CCR system to measure algorithmic accuracy for relevance.

14. The method of claim 10 further comprising:
mapping the CCR types associated with the CCR system to one or more business relevancy standards directly based on one or more of business applications with different business relevancy standards, changes in a business relevancy standard over time, or concurrent multiple business relevancy standards.

15. An online Internet auction method that employs the method of claim 10 to facilitate automatic auctioning of keywords.

16. The system of claim 10, wherein the evaluation component adapts to changes in a business relevancy standard by altering the obtained mapping relationship between business relevancy decisions and respective cognitive types over time without requiring retraining of the evaluation component.

17. The method of claim 10, wherein the evaluating relevancy comprises:
utilizing one or more business relevancy models to evaluate the one or more CCR types associated with the input data item pair; and
obtaining a relevancy determination from the one or more business relevancy models based at least in part on the evaluation.

18. A computer-readable storage medium having stored thereon computer-executable instructions to implement acts that facilitate generation of a relevancy decisions in search engine keyword auctions, the acts comprising:
obtaining a pairing of a keyword and an advertising target;
employing a cognitive concept relationship system to the pairing to identify a relationship between the keyword and the advertising target;
assigning a cognitive concept relationship type indicating the identified relationship between the keyword and the advertising target to the pairing in accordance with the identified relationship, the assigned type indicates one of:
the keyword and the advertising target are identical;
the keyword is a superset of the advertising target;
the keyword is a subset of the advertising target;
the keyword and the advertising target overlap; or
the keyword and the advertising target are respective members of disjoint cognitive concept categories;
utilizing a relevancy model to generate a keyword relevancy based upon the cognitive concept relationship type assigned to the pairing, the relevancy model can be modular such that relevancy models can be interchanged to generate distinct keyword relevancies without alteration of the cognitive concept relationship system; and
generating a decision based upon the keyword relevancy provided by the relevancy model, the decision is one of a decision to bid on the keyword to be associated with the advertising target or a decision to not bid on the keyword to be associated with the advertising target.

\* \* \* \* \*